United States Patent
Dhara et al.

(10) Patent No.: US 8,621,003 B2
(45) Date of Patent: Dec. 31, 2013

(54) ENHANCED APPLICATION-LAYER MULTICAST FOR PEER-TO-PEER CONFERENCING

(75) Inventors: Krishna Kishore Dhara, Parlin, NJ (US); Venkatesh Krishnaswamy, Holmdel, NJ (US); Xiaotao Wu, Metuchen, NJ (US)

(73) Assignee: Avaya Inc., Basking Ridge, NJ (US)

(*) Notice: Subject to any disclaimer, the term of this patent is extended or adjusted under 35 U.S.C. 154(b) by 1571 days.

(21) Appl. No.: 11/946,574

(22) Filed: Nov. 28, 2007

(65) Prior Publication Data
US 2009/0135740 A1  May 28, 2009

(51) Int. Cl.
*G06F 15/16* (2006.01)

(52) U.S. Cl.
USPC .......................................... 709/204

(58) Field of Classification Search
None
See application file for complete search history.

(56) References Cited

U.S. PATENT DOCUMENTS

| 7,006,616 B1* | 2/2006 | Christofferson et al. | 379/202.01 |
| 2007/0041366 A1* | 2/2007 | Vugenfirer et al. | 370/352 |
| 2007/0086366 A1 | 4/2007 | Luo et al. | |

OTHER PUBLICATIONS

Lennox, Jonathan and Schulzrinee, Henning. Citation for "A Protocol for Reliable Decentralized Conferencing."*
Chong Luo et al, DigiMetro—An Application-Level Multicast System for Multi-party Video Conferencing, Microsoft Research Asia, Published Nov. 2004.
Yang-Hua Chu et al, Enabling Conferencing Applications on the Internet using an Overlay Multicast Architecture, SIGCOMM '01, Aug. 27-31, 2001, San Diego, CA, USA.
Jonathan Lennox, et al, A Protocol for Reliable Decentralized Conferencing, NOSSDAV '03, Jun. 1-3, 2003, Monterey, CA, USA.
John Jannotti, et al, Overcast: Reliable Multicasting with an Overlay Network, Cisco Systems, Proceedings of the Fourth Synopsium on Operating System Design and Implementation, Oct. 2000.

* cited by examiner

*Primary Examiner* — Scott Christensen

(57) ABSTRACT

An application-layer multicast-based (ALM-based), peer-to-peer conferencing system is disclosed that leverages the differing capabilities of the participating peer nodes. A conference call can be set up among peer nodes of three different types. A bridging node is capable of mixing individual audio signals that are associated with a call into a composite audio signal and of providing the composite audio signal to another node. A mixing-capable node is capable of mixing the individual audio signals that are associated with a call, but not of relaying those signals to another node. A mixing-incapable node does not support the mixing of individual audio signals. The conferencing architecture of the illustrative embodiment is able to account for the differences between the three types of nodes that are to participate in a conference call, resulting in an optimal allocation of bandwidth and processing resources.

18 Claims, 5 Drawing Sheets

… (1)

ENHANCED APPLICATION-LAYER MULTICAST FOR PEER-TO-PEER CONFERENCING

FIELD OF THE INVENTION

The present invention relates to telecommunications in general, and, more particularly, to an enhanced, application-layer multicast-based (ALM-based) system for peer-to-peer conferencing.

BACKGROUND OF THE INVENTION

"Multicasting" refers to the delivery of information to a group of nodes in a telecommunications network simultaneously using the most efficient strategy to deliver the messages over each physical link of the network only once. One application for multicasting is decentralized conferencing, in which a plurality of nodes, such as telecommunications endpoints, exchange audio or video information with one another and not through a centralized server.

Internet Protocol multicast, or "IP multicast," was the earliest approach to decentralized conferencing. In IP multicast, the multicast function is implemented at the network layer of an interconnection reference model. IP multicast relies on hardware such as routers to provide the multicast support; consequently, the inconsistent deployment of multicast-enabled routers has caused many multicast communication applications to fail.

Developers have since turned to "multiple unicast" to implement one-to-many communication. Multiple unicast, however, has its own problems. In contrast to IP multicast, which ensures only one packet on any physical link, multiple unicast replicates data at the source, making the link between the source node and the closest network node a severe bottleneck. Multiple unicast is also unable to limit throughput to accommodate the least capable member in a multiparty conference, which can be a problem as connectivity on the Internet is heterogeneous, ranging from high speed T1 lines, cable modems, and ADSL, to slow-speed dial-up connections.

Not surprisingly, there has been a surge of "application-layer multicast" (ALM) systems designed for various types of applications. Compared with other approaches, such as IP multicast or multiple unicast, ALM-based solutions can better handle network transmission latency and do not require multicast support in the underlying network. However, the ALM-based approaches in the prior art typically assume that all of the nodes participating in a conference call support audio mixing, which is not always true. For example, a cell phone connected through a Public-Switched Telephone Network (PSTN) gateway to a Voice over Internet Protocol (VoIP) network might not support audio mixing. The prior-art ALM-based approaches often cannot even handle a relatively simple three-way call with one node supporting the mix-and-distribute function known as "conference bridging" (or just "bridging") on behalf of the two other nodes involved. In addition, the prior-art ALM-based approaches are often not scaleable in terms of bandwidth utilization. This is because there is no mixing performed along the routing path, so every node's audio stream must reach all of the other nodes involved in a conference call.

Mixing the audio streams by using a centralized conferencing server can reduce the required bandwidth. However, a centralized conference is not always appropriate for an environment with limited bandwidth. For example, FIG. 1 in the prior art depicts conferencing configuration 100 with centralized server 101 that serves branches 110-1 and 110-2, each of the two branches having sufficient intranet bandwidth but limited inter-branch bandwidth. Using a layered conferencing approach (as depicted) increases the bandwidth and processing within a branch but reduces the inter-branch bandwidth usage, and as a result might be suitable for some scenarios. However, it requires the deployment of nodes that can handle audio mixing in each branch, namely mixer node 102-1 providing the mixing for nodes 103-1 and 103-2 and mixer node 102-2 providing the mixing for nodes 103-3, 103-4, and 103-5.

In view of these prior-art techniques, what is needed is a conferencing system that considers both the bandwidth-handling and the mixing capabilities of the participating peer nodes when setting up a decentralized peer-to-peer conference, without some of the disadvantages in the prior art.

SUMMARY OF THE INVENTION

The present invention is related to an application-layer multicast-based (ALM-based), peer-to-peer conferencing system that leverages the differing capabilities of the participating peer nodes. In accordance with the illustrative embodiment of the present invention, a conference call can be set up among peer nodes of three different types: a bridging node, which is capable of mixing individual audio signals that are associated with a call into a composite audio signal and of providing the composite audio signal to another node; a mixing-capable node, which is capable of mixing the individual audio signals that are associated with a call, but not of relaying those signals to another node; and a mixing-incapable node, which does not support the mixing of individual audio signals. The conferencing architecture of the illustrative embodiment is able to account for the differences between the three types of nodes that are to participate in a conference call, resulting in an improved allocation of bandwidth and processing resources than is achievable with some of the techniques in the prior art.

In accordance with the illustrative embodiment, the disclosed conferencing system constructs a hybrid ALM-based conference via a three-step, bottom-up algorithm. The first step associates one or more mixing-incapable nodes with one or more bridging nodes. The second step forms ALM routes between all of the bridging nodes and the mixing-capable nodes. And the third step optimizes the conference by bridging various ALM-based subconferences that were formed as part of the second step. The algorithm is based on the types of nodes participating in the conference, on the maximum number of audio signal streams that a node can mix, and on the maximum chaining of bridging nodes allowable in a given network. By accounting for these properties, the conference system of the illustrative embodiment increases the scalability of ALM-based peer-to-peer conferencing.

The illustrative embodiment of the present invention comprises: identifying an overall plurality of nodes that are to be involved in a conference call, the overall plurality of nodes comprising i) a first plurality of bridging nodes that are capable of mixing individual audio signals into a composite audio signal and of providing the composite audio signal to another node, and ii) a second plurality of mixing-capable nodes that are capable of mixing the individual audio signals, but are incapable of providing the composite audio signal to another node; forming a first subconference based on application-layer multicasting, the first subconference involving a first bridging node from the first plurality and at least one mixing-capable node from the second plurality; and determining whether the first subconference is to mix or to relay the audio signals contained in a first audio stream that is received from a first external node that is outside of the first subconference, the determination to mix or to relay being based on one or more predetermined performance criteria.

DETAILED DESCRIPTION

The following terms are defined for use in this Specification, including the appended claims:

The term "call," and its inflected forms, is defined as an interactive communication involving two or more participating nodes (e.g., telecommunications endpoints or phones, etc.). A voice call that involves audio signals is featured in the illustrative embodiment of the present invention. However, it will be clear those who are skilled in the art, after reading this specification, how to make and use alternative embodiments in which a call is a video call with audio, or an instant messaging (IM) session with audio, or yet another type of call where mixable signals are exchanged. Furthermore, a call can involve one or more human call parties, or one or more automated devices, or both.

The term "bridging node," and its inflected forms, is defined as an endpoint or other telecommunications device that is capable of mixing individual audio signals that are associated with a call into a composite audio signal and of providing the composite audio signal to another node.

The term "mixing-capable node," and its inflected forms, is defined as an endpoint or other telecommunications device that mixes, but does not relay to another node, individual audio signals that are associated with a call. In other words, the mixing-capable node mixes received audio signals for playing out to its user; it also transmits the audio signal originating from its own user to one or more other nodes, without first mixing its user's audio signal with any other audio signal received.

The term "mixing-incapable node," and its inflected forms, is defined as an endpoint or other telecommunications device that does not support the mixing of individual audio signals. A bridging node has to perform the mixing function on behalf of and then provide the resulting composite signal to a mixing-incapable node.

Figure 1:
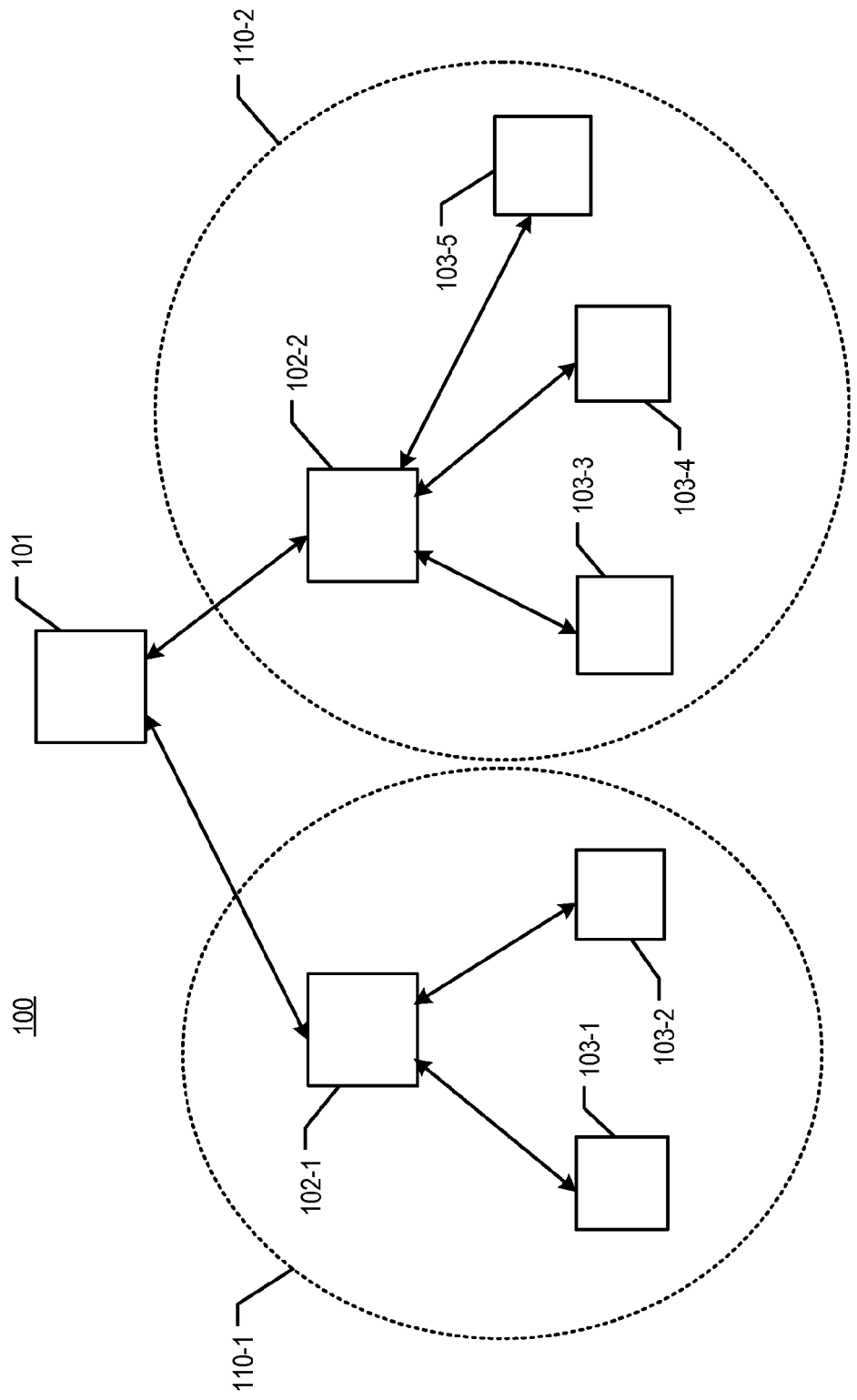
FIG. 1 depicts an example of a layered conferencing configuration in the prior art.
Figure 2:
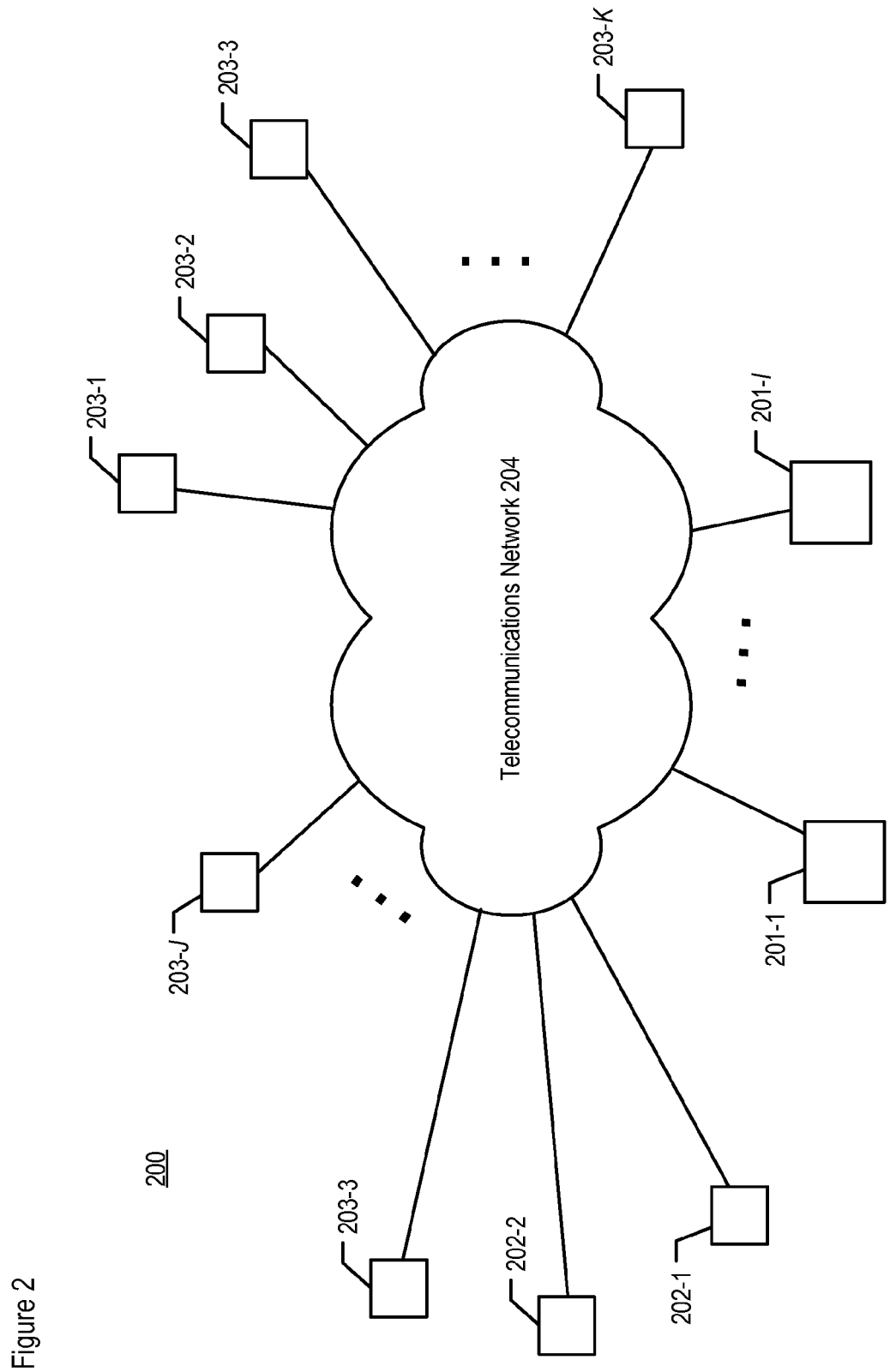
FIG. 2 depicts a schematic diagram of the salient components of teleconference system 200, in accordance with the illustrative embodiment of the present invention.

FIG. 2 depicts a schematic diagram of the salient components of teleconference system 200 in accordance with the illustrative embodiment of the present invention. System 200 comprises bridging nodes 201-1 through 201-I, wherein I is a positive integer; mixing-capable nodes 202-1 through 202-J, wherein J is a positive integer; mixing-incapable nodes 203-1 through 203-K, wherein K is a positive integer; and telecommunications network 204, interconnected as shown. Each of the nodes depicted is considered to be a "peer" to the other nodes present. A conference call that occurs among multiple nodes in system 200 is referred to as a "peer-to-peer" conference, in that the audio signals exchanged are not required to pass through a centralized server.

Bridging node 201-i, wherein i has a value between 1 and I inclusive, is a data-processing device that is capable of originating, receiving, or otherwise handling a telephone call for its user. Node 201-i is able to call, or to be called by, another endpoint. Node 201-i receives audio signals from endpoints that are participating on a conference call, mixes those signals together into one or more composite signals that are based on the transfer function associated with each output channel, transmits the composite signals to the endpoints, and presents the mixed signals to its user via a loudspeaker. Depending on the nodes that are to be involved in a conference call, node 201-i might mix all of the audio signals arriving from the other nodes or only some of the audio signals arriving from the nodes. For example, node 201-1 might act as a mixer for mixing-incapable nodes 203-1, 203-2, and 203-2, but only as a relay of unmixed audio signals to mixing-capable nodes 202-1, 202-1, and 202-3.

Figure 5:
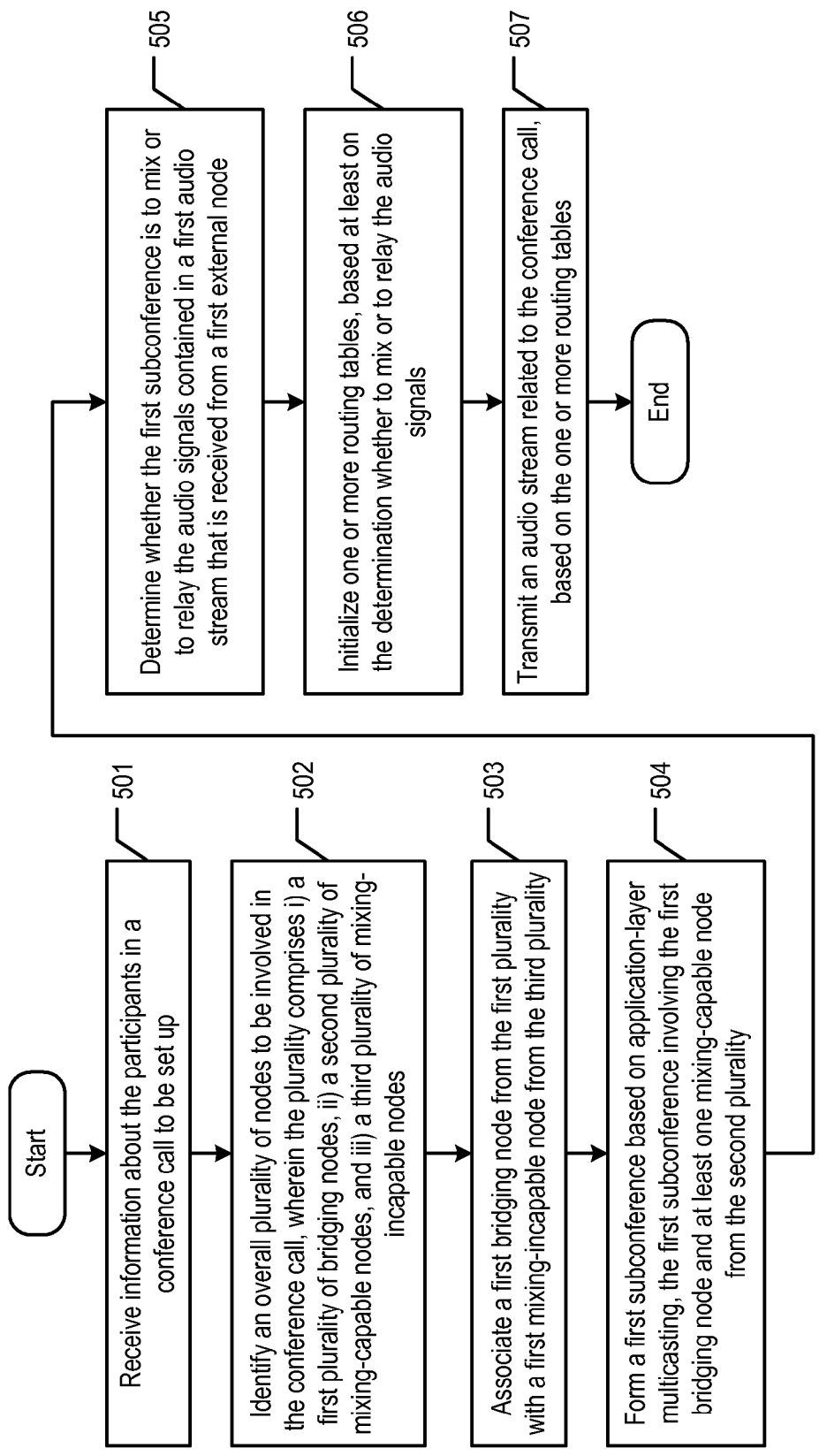
FIG. 5 depicts a flowchart of the salient tasks involved in setting up a conference call, in accordance with the illustrative embodiment of the present invention.

In accordance with the illustrative embodiment, bridging node 201-i (e.g., node 201-1, etc.) performs at least some of the tasks described below and with respect to FIG. 5 that relate to setting up a conference call that involve different types of nodes. However, it will be clear to those skilled in the art, after reading this specification, how to make and use alternative embodiments in which some of all of the tasks described with respect to FIG. 5 are performed at a data-processing device other than bridging node 201-i, such as a dedicated server.

Mixing-capable node 202-j, wherein j has a value between 1 and J inclusive, is a data-processing device that is capable of originating, receiving, or otherwise handling a telephone call for its user. Node 202-j is able to call, or to be called by, another endpoint. Node 202-j receives audio signals from endpoints that are participating on a conference call, mixes those signals together into a composite signal, and presents the mixed signals to its user via a loudspeaker.

Mixing-incapable node 203-k, wherein k has a value between 1 and K inclusive, is a data-processing device that is capable of originating, receiving, or otherwise handling a telephone call for its user. Node 203-k is able to call, or to be called by, another endpoint. Unlike mixing-capable node 202-j, however, mixing-incapable node 203-k receives a single audio signals stream from another endpoint that is participating on a conference call, and does not mix the received signal before presenting that signal to its user.

Each of the nodes depicted in FIG. 2 (i.e., nodes 201-i, 202-j, and 203-k) can be an ISDN terminal, a softphone running on a computer, an Internet-Protocol phone, a cellular phone, a cordless phone, a PBX deskset, a conference phone (i.e., "speakerphone"), or some other type of telecommunications appliance. The depicted nodes can be different from one another, such that bridging node 201-1 can be a softphone on a notebook computer, mixing-capable node 202-1 can be a desk set, mixing-incapable node 203-1 can be a cell phone, and so forth. Each node handles calls via telecommunications network 204 and is capable of exchanging voice and call processing-related signals with one or more other nodes. To this end, each node exchanges Internet Protocol (IP) data packets with other nodes, wherein the packets comprise audio signals.

Telecommunications network 204 provides the connectivity across bridging nodes 201-1 through 201-I, mixing-capable nodes 202-1 through 202-J, and mixing-incapable nodes 203-1 through 203-K. Network 204 is a network such as the Public Switched Telephone Network [PSTN], the Internet, etc. that carries call-related data packets between the endpoints.

It will be clear to those skilled in the art, after reading this specification, how to make and use embodiments of the present invention that comprise various combinations of networks within teleconference system 200, which networks are public or private, wired or wireless, and circuit-based or packet-based.

In addition to exchanging IP packets with each other, the nodes of telecommunications system 200 support the Session Initiation Protocol (SIP), as is well-known in the art. SIP is an application-layer control or signaling protocol for creating, modifying, and terminating sessions with one or more participants. The sessions include, in addition to Internet telephone calls, multimedia distribution and multimedia conferences. It will be clear to those skilled in the art, after reading this specification, how to make and use alternative embodiments that feature other protocols than SIP.

Figure 3:
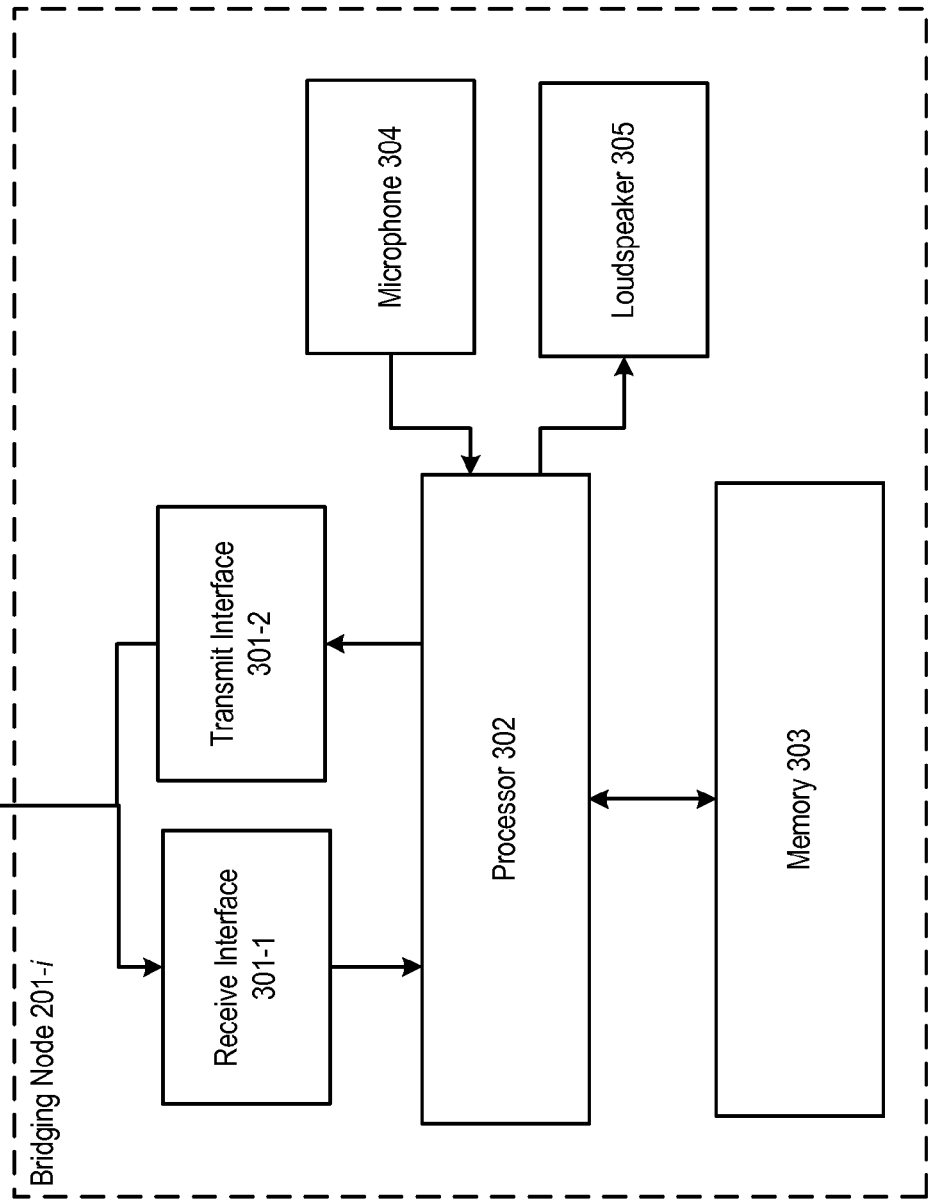
FIG. 3 depicts a schematic diagram of the salient components of bridging node 201-i, which is part of system 200.

FIG. 3 depicts a schematic diagram of the salient components of bridging node 201-$i$, in accordance with the illustrative embodiment of the present invention. Bridging node 201-$i$ comprises receive interface 301-1, transmit interface 301-2, processor 302, memory 303, microphone 304, and loudspeaker 305, interconnected as shown.

Receive interface 301-1 and transmit interface 302-2 comprise the circuitry that enables node 201-$i$ to respectively receive signals from and transmit signals to network 204, in well-known fashion. In accordance with the illustrative embodiment, node 201-$i$ receives and transmits audio signals that are represented in Internet Protocol packets, in well-known fashion. As those who are skilled in the art will appreciate, in some alternative embodiments node 201-$i$ receives and transmits audio signals represented in a different format.

Processor 302 is a general-purpose processor that is capable of receiving information from receive interface 301-1, of executing instructions stored in memory 303, of reading data from and writing data into memory 303, and of transmitting information to transmit interface 301-2. In some alternative embodiments of the present invention, processor 302 might be a special-purpose processor. Processor 302 performs the audio mixing function at bridge 304, in accordance with the illustrative embodiment of the present invention. As part of the audio mixing function, processor 302 is able to take any input audio signal from any endpoint or other source and mix it into the composite output audio signal to be transmitted to a particular endpoint, for all endpoints to which mixed audio signals are to be transmitted. The specific output signal to a given endpoint is based on the mixer transfer function associated with that output signal.

Memory 303 stores the instructions and data used by processor 302, in well-known fashion. Memory 303 might be any combination of dynamic random-access memory (RAM), flash memory, disk drive memory, and so forth.

Microphone 304 transmits user-original audio signals to processor 302, in well-known fashion. Loudspeaker 305 transmits conference-related audio signals to the user of node 201-$i$, in well-known fashion.

Figure 4:
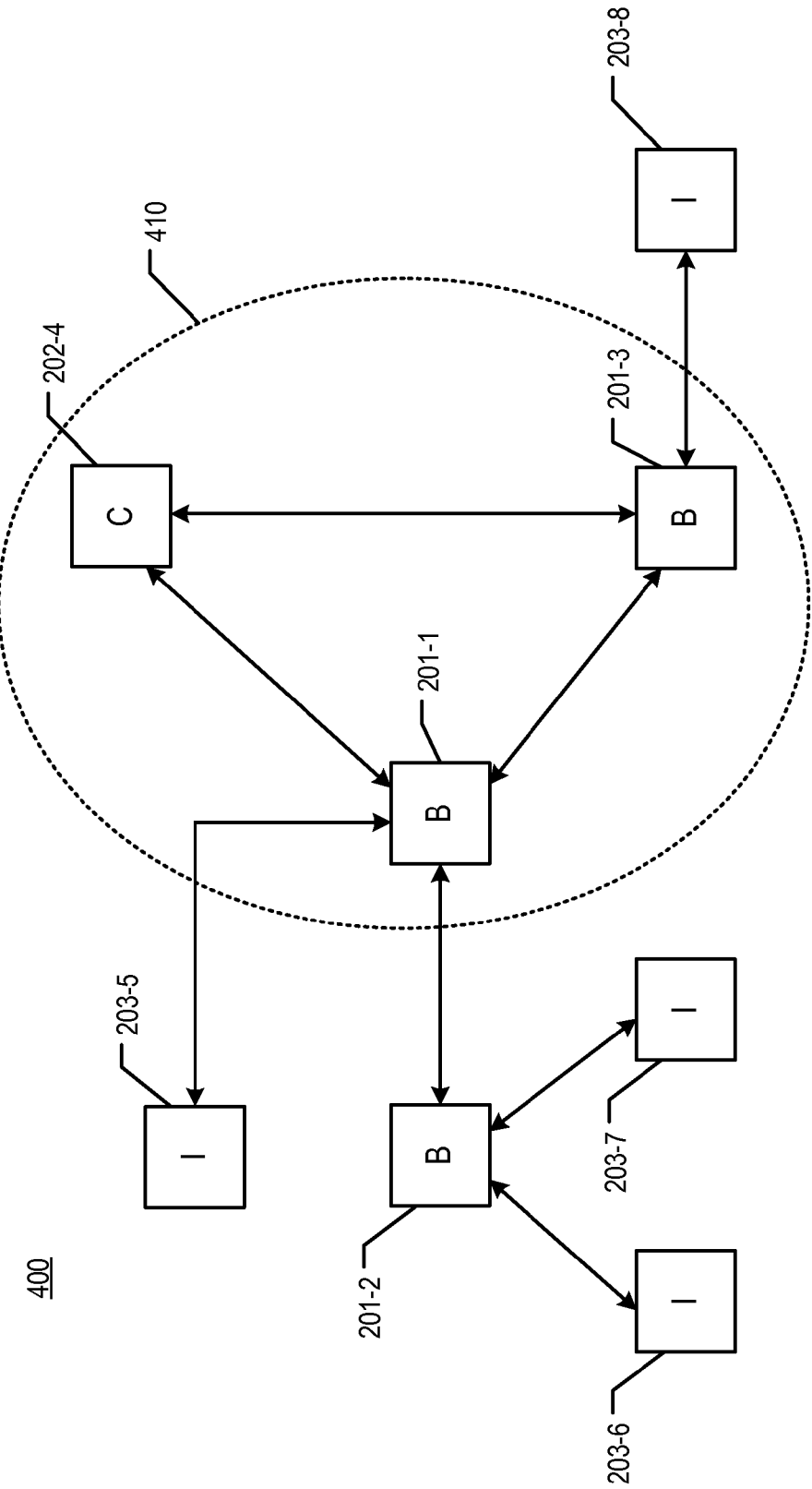
FIG. 4 depicts a schematic diagram of sample configuration 400, which represents the salient details of the architecture of the illustrative embodiment.

FIG. 4 depicts a schematic diagram of the salient details of the architecture of the illustrative embodiment. Configuration 400 is an illustrative configuration that is based on application-layer multicasting but uses a combination of bridging nodes, mixing-capable nodes, and mixing-incapable nodes. In the example depicted, bridging nodes 201-1, 201-2, and 201-3; mixing-capable node 202-4; and mixing-incapable nodes 203-5, 203-6, 203-7, and 203-8 make up the configuration. It will be clear to those skilled in the art, after reading this specification, how to make and use architectural configurations with a different combination of bridging nodes, mixing-capable nodes, and/or mixing-incapable nodes than that depicted.

In the configuration depicted, each bridging node 201-$i$ (labeled "B") can bridge one or more mixing-incapable nodes 203-$k$ (labeled "I") into a conference. Bridging node 201-$i$ can also relay packets that comprise audio signals for other bridging nodes or mixing-capable nodes 202-$j$ (labeled "C"). In accordance with the illustrative embodiment, bridging nodes and mixing-capable nodes are able to form an application-layer multicast-based (ALM-based) conference, as represented by ALM routing domain 410. Each node in domain 410 finds its own optimized route for its audio packets. Furthermore, bridging nodes can also join with other bridging nodes to form a layered conference. Whether to form a layered conference or to relay packets depends on the processing capabilities and the bandwidth handling capability of the bridging nodes.

FIG. 5 depicts a flowchart of the salient tasks involved in setting up a conference call, as performed by one or more nodes of system 200 and in accordance with the illustrative embodiment of the present invention. As those who are skilled in the art will appreciate, at least some of the tasks depicted in FIG. 5 can be performed simultaneously or in a different order than that depicted. In accordance with the illustrative embodiment, bridging node 201-1 executes at least some of the depicted tasks, which are described below. However, it will be clear to those skilled in the art, after reading this specification, how to make and use alternative embodiments of the present invention, in which a data-processing device other than bridging node 201-1, such as a dedicated data-processing device, executes some or all of the described tasks, along with one or more of the other nodes in system 200.

At task 501, one or more nodes within system 200 receive information about the participants in a conference call to be set up. For example, the information might comprise the addresses of the participant nodes, as well as their capabilities (i.e., bridging, mixing-capable, mixing-incapable).

At task 502, one or more nodes within system 200 identify the nodes to be involved in the conference call, based on the information received at task 501, wherein the nodes to be involved comprise i) a first plurality of bridging nodes 201, ii) a second plurality of mixing-capable nodes 202, and iii) a third plurality of mixing-incapable nodes 203.

At task 503, one or more nodes within system 200 associate i) a mixing-incapable node 203-$k$ from the plurality of mixing-incapable nodes with ii) a bridging node 201-$i$ from the plurality of bridging nodes. If there are other mixing-incapable nodes present, system 200 associates those mixing-incapable nodes with bridging nodes. As those who are skilled in the art will appreciate, a "greedy" algorithm can be used to assist with associating mixing-incapable nodes with the closest bridging node or nodes, based on the bridging nodes' mixing capabilities and latencies that would be experienced. In some embodiments, the mixing capability, in turn, is based on the bandwidth handling capability and the processing (i.e., "computational") capability of each bridging node being considered. For example, system 200 attempts to associate each mixing-incapable node 203-$k$ with a bridging node that results in the shortest latency, until that bridging node reaches its maximum mixing capability with respect to processing capability. Then, if a mixing-incapable node's connection to the closest bridging node is rejected for reasons of processing capability, system 200 instead finds the next-closest bridging node to the mixing-incapable node being considered.

Referring to FIG. 4 as an example, mixing-incapable node 203-5 is associated with bridging node 201-1, mixing-incapable nodes 203-6 and 203-7 are associated with bridging node 201-2, and mixing-incapable node 203-8 is associated with bridging node 201-3. By associating all of the mixing-incapable nodes involved in the conference call with one or more bridging nodes, as is accomplished by this task, the system of the illustrative embodiment is able account for all audio signal mixing that is to be performed on behalf of the mixing-incapable nodes.

At task 504, one or more nodes within system 200 form one or more subconferences based on application-layer multicasting (ALM). Note that the nodes and paths involved in a given ALM-based subconference make up a unique ALM routing domain, such as domain 410. Prior-art techniques proposed by Yoid, Overcast, Gossamer, and Narada can be used to find routes for the nodes that support mixing and to form an ALM-based subconference. Each node in a subconference has its own routing tree that governs the distribution of packets. In some embodiments, the formation of a subconference is based only on the latency that would be experienced and the available bandwidth, and without considering the bridging and processing capabilities of each node.

Again referring to FIG. 4, the subconference represented by domain 410 involves at least one bridging node (e.g., node 201-1 as depicted in FIG. 4, etc.) and at least one mixing-capable node (e.g., node 202-4, etc.) from the plurality of mixing-capable nodes identified at task 502. Although only a single subconference is depicted, more than one subconference can be formed in accordance with the illustrative embodiment, as those who are skilled in the art will appreciate.

At task 505, for each subconference formed, one or more nodes within system 200 determine whether the subconference is to mix or to merely relay the audio signals that are contained in an audio stream that is received from a node that is external to the first subconference, for each external node and in accordance with the illustrative embodiment. In this task, the conference being formed is optimized by introducing the bridging function to the ALM-based subconference. That is, although bridging node 201-$i$ is capable of mixing individual audio streams, it might not make sense to mix certain audio streams for certain nodes and might instead make sense to relay one or more audio streams that the bridging node receives.

For each node that is external to the subconference, the latency and audio quality degradation (i.e., impairment in waveform quality) that would be introduced by mixing are compared with the latency and audio quality degradation that would be introduced by relaying the received audio stream. For instance, relaying the received audio stream might increase the latency experienced at one or more other nodes connected to the present bridging node being considered, as well as the bandwidth utilization at the bridging node. If the latency and audio quality degradation introduced by relaying exceed those properties introduced by mixing, the present bridging node being considered should mix the received audio stream, rather than relay the stream.

As illustrated in FIG. 4, it might be determined, for example, that bridging node 201-1 will i) mix in the received signal from node 201-1 and ii) distribute that signal, as part of one or more composite signals, to the other nodes to which the node is connected. In contrast, bridging node 201-3 might merely relay the received audio signals from node 203-8 to node 202-4, but might mix the received audio signals from node 203-8 along with other received signals and then transmit the resulting composite signal to node 201-1. As those who are skilled in the art will appreciate, mixing versus relaying can be considered at multiple subconferences, if more than one subconference has been formed.

At task 506, one or more nodes within system 200 initialize one or more routing tables, based on at least the mix-versus-relay determination performed at task 505. The routing tables are then distributed as needed to the nodes involved in the conference call.

At task 507, one or more nodes within system 200 set up the conference call among the nodes identified at task 502. During the conference call, the nodes within system 200 transmit audio streams that are related to the conference call, based on the one or more routing tables initialized at task 506.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   identifying an overall plurality of nodes for a conference call, the overall plurality of nodes comprising:
   a plurality of bridging nodes that can mix individual audio signals into a composite audio signal and provide the composite audio signal to another node;
   a plurality of mixing-capable nodes that can mix the individual audio signals but do not provide the composite audio signal to another node; and
   a plurality of mixing-incapable nodes that are not capable of mixing the individual audio signals;
   associating a mixing-incapable node from the plurality of mixing-incapable nodes and a mixing-capable node from the plurality of mixing-capable nodes with a bridging node from the plurality of bridging nodes to yield a subconference; and
   when the bridging node receives an audio stream from an external node that is outside of the subconference:
   relaying audio signals in the audio stream to the mixing-capable node as unmixed individual audio signals based on predetermined performance criteria; and
   mixing the audio signals and providing the composite audio signal to the mixing-incapable node.

2. The method of claim 1, wherein associating the first mixing-incapable node with the bridging node is based on a mixing capability of the bridging node.

3. The method of claim 2, wherein the mixing capability is based on a bandwidth capability of the bridging node.

4. The method of claim 2 wherein the mixing capability is based on a processing capability of the bridging node.

5. The method of claim 1, wherein associating the mixing-incapable node with the bridging node is based on a latency experienced by the mixing-incapable node.

6. The method of claim 1, further comprising associating a second mixing-incapable node from the plurality of mixing-incapable nodes with the bridging node.

7. The method of claim 1, wherein associating the mixing-incapable node and the mixing-capable node with the bridging node is based only on a latency that is experienced by the external node and a communication bandwidth that is available between the external node and the bridging node.

8. The method of claim 1, wherein the predetermined performance criteria comprise at least one of a latency that is introduced in the audio signals and an amount of impairment in waveform quality that is introduced in the audio signals.

9. A non-transitory computer-readable medium having stored therein instructions which, when executed by a processor, cause the processor to perform a method comprising:
identifying an overall plurality of nodes for a conference call, the overall plurality of nodes comprising:
a plurality of bridging nodes that can mix individual audio signals into a composite audio signal and provide the composite audio signal to another node;
a plurality of mixing-capable nodes that can mix the individual audio signals but do not provide the composite audio signal to another node; and
a plurality of mixing-incapable nodes that are not capable of mixing the individual audio signals;
associating a mixing-incapable node from the plurality of mixing-incapable nodes and a mixing-capable node from the plurality of mixing-capable nodes with a bridging node from the plurality of bridging nodes to yield a subconference; and
when the bridging node receives an audio stream from an external node that is outside of the subconference:
relaying audio signals in the audio stream to the mixing-capable node as unmixed individual audio signals based on predetermined performance criteria; and
mixing the audio signals and providing the composite audio signal to the mixing-incapable node.

10. The non-transitory computer-readable medium of claim 9, wherein the predetermined performance criteria is based on at least one of a latency that is introduced in the audio signals and an amount of impairment in waveform quality that is introduced in the audio signals.

11. The non-transitory computer-readable medium of claim 9, wherein associating the mixing-incapable node and the mixing-capable node with the bridging node is based on a mixing capability of the bridging node.

12. The non-transitory computer-readable medium of claim 11, wherein the mixing capability is based on at least one of a bandwidth capability of the bridging node and a processing capability of the bridging node.

13. The non-transitory computer-readable medium of claim 11, wherein associating the mixing-incapable node with the bridging node is based on a latency experienced by the mixing-incapable node.

14. The non-transitory computer-readable medium of claim 9, wherein associating the mixing-incapable node and the mixing-capable node with the bridging node is based only on a latency that is experienced by the external node and a communication bandwidth that is available between the external node and the bridging node.

15. A system comprising:
a processor; and
a memory having stored therein instructions which, when executed by the processor, cause the processor to perform a method comprising:
identifying an overall plurality of nodes for a conference call, the overall plurality of nodes comprising:
a plurality of bridging nodes that can mix individual audio signals into a composite audio signal and provide the composite audio signal to another node;
a plurality of mixing-capable nodes that can mix the individual audio signals but do not provide the composite audio signal to another node; and
a plurality of mixing-incapable nodes that are not capable of mixing the individual audio signals;
associating a mixing-incapable node from the plurality of mixing-incapable nodes and a mixing-capable node from the plurality of mixing-capable nodes with a bridging node from the plurality of bridging nodes to yield a subconference; and
when the bridging node receives an audio stream from an external node that is outside of the subconference:
relaying audio signals in the audio stream to the mixing-capable node as unmixed individual audio signals based on predetermined performance criteria; and
mixing the audio signals and providing the composite audio signal to the mixing-incapable node.

16. The system of claim 15, wherein associating the mixing-incapable node with the bridging node is based on a bandwidth capability of the bridging node.

17. The system of claim 15, wherein associating the mixing-incapable node with the bridging node is based on a processing capability of the bridging node.

18. The system of claim 15, wherein the bridging node comprises a data-processing device for forming the subconference.

* * * * *